June 28, 1955 — E. B. F. BONNEFONT — 2,711,651
ERECTOR DEVICES FOR GYROSCOPIC HORIZONS
Filed Sept. 22, 1953
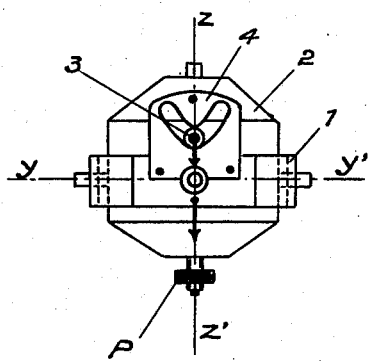
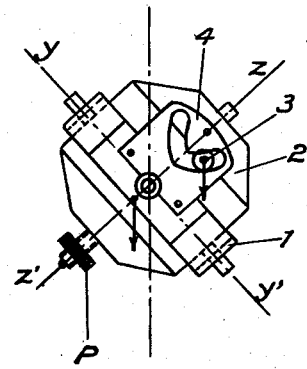
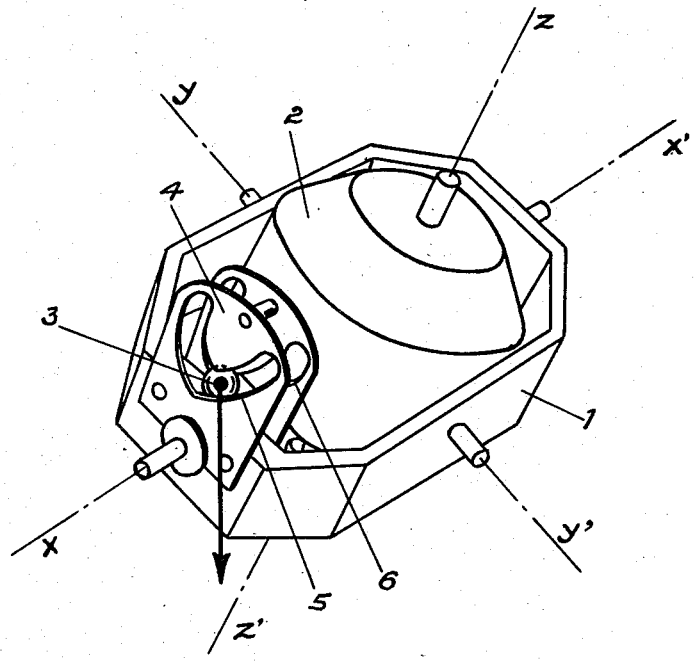
INVENTOR:
EDMOND, BERNARD, FRANÇOIS BONNEFONT United States Patent Office 2,711,651
Patented June 28, 1955

2,711,651

ERECTOR DEVICES FOR GYROSCOPIC HORIZONS

Edmond Bernard François Bonnefont, Neuilly-Plaisance, France, assignor to Société Française d'Équipements pour la Navigation Aérienne S. F. E. N. A., Neuilly-sur-Seine, France, a joint-stock company of France Application September 22, 1953, Serial No. 381,597

Claims priority, application France September 24, 1952

4 Claims. (Cl. 74—5.4)

The present invention concerns a device which is intended to improve the performance of gyro-horizons during turns by reducing the amplitude of the errors which are introduced by reason of centrifugal acceleration, and in particular in the case of aircraft flying at very high speed and turning at very high banking angles.

It is well known that during turnings of long duration, gyro-horizons, which are provided with an erector system causing a movement of precession tending to bring their axis back to the direction of the apparent vertical, give rise to errors. In the case of human or automatic control of the aircraft, these errors result in a variation of base which, if great care is not taken, is the cause of a very appreciable loss in altitude.

In order to overcome this drawback to a certain extent, it is known to construct the erector system in such a way that the gyro has a position of equilibrium in which its axis is slightly inclined in the horizontal plane.

The result of this arrangement is that, when making turns, a gyrostatic couple is produced which is proportional to the angular speed of the aircraft and to the horizontal component of the kinetic moment of the gyro. It can be so arranged that this reaction will compensate for the centrifugal disturbance, that is to say that the moment of the gyrostatic couple due to the displacement of the aircraft from its vertical axis will be equal and opposite at every instant to the moment of the restoring couple created by the erector under the action of centrifugal acceleration.

In order that this compensation should be both useful and exact in the case of turns of different characteristics, it is essential that the law governing the movement of precession of the gyro, created by the erector, should comply with certain conditions. Amongst these conditions, there is one which is essential, viz., that the precession of erection should always remain "meridian," i. e., to say the axis of the gyro should always be impelled by the action of the erector to move towards its position of equilibrium following a direct trajectory, whatever the angle of tilt during turning may be.

In particular, in the case of gyro-horizons having erectors with turning balls, it is only possible to obtain a restoring force which follows a strictly direct trajectory in the case of certain well-defined angles of tilt; for all other angles, the erecting force includes a component of precession at right angles which induces errors for which the artifice of the inclined axis is not able to compensate; this disturbing component may in practice be reduced to an admissible value for turns made with a small angle of tilt, but in the case of very sharp turns, having tilt angles between 30° and 80° for example, it becomes impossible to obtain at the present time any acceptable compensation.

In such gyro-horizons, the compromise adjustment which enables the transverse component of precession to be eliminated for a given angle of tilt, consists in varying the value of the out-of-vertical angle of the suspended equipment by the displacement of an unbalanced weight parallel to the axis of the gyro.

The optimum angle of swing necessary for a given angle of tilt, that is to say that which corresponds to an erecting force following an absolutely direct trajectory, is shown to be too great for larger angles of tilt and, in order to solve the problem of a meridian erection in the case of all angles of tilt, it would appear desirable to modify the sinusoidal law of the moments of the suspended balance weight as a function of the angle of tilt.

The device which constitutes the object of the present invention enables the above-mentioned disadvantages to be avoided by reason of the fact that it is arranged so as to supplement the suspended equipment by an auxiliary balance weight which has the effect of opposing an anti-swinging motion, this out-of-balance weight being capable of lateral displacement under the influence of the apparent weight, following a suitable trajectory, in such a way as to create at every instant an opposing moment which reduces by the desired amount, and for all angles of tilt, the swinging moment of the suspended equipment.

In accordance with a particularly simple embodiment of the invention, the moving auxiliary counter-weight which forms an adjunct to the suspended equipment or suspension, is constituted by a spherical ball mounted for free movement along a roller track arranged on the moving equipment and having such a form that for every given angle of tilt the ball takes up a position such that it produces a couple which acts in opposition to the swinging couple of the equipment, thereby only leaving active the couple which is necessary to ensure, in combination with the action of the erector, the meridian precession which corresponds exactly to the given angle of tilt.

Other features and advantages will become clear from the description which follows below, reference being made to the attached drawing which shows diagrammatically, and only by way of example, a gyro-horizon having a rotating erector provided with a corrector device in accordance with the invention.

In the drawing:

Fig. 1 shows the gyroscope in elevation, seen from the front of the aircraft, during normal horizontal flight.

Fig. 2 shows this same gyro during banked turn, the arrows showing the direction of the apparent weight.

Fig. 3 is a perspective view of the general layout of the instrument provided with the corrector device.

With reference to the drawing, the axis XX' of the frame of the Cardan 1 is arranged parallel to the longitudinal axis of the aircraft, the gyro, properly so-called and its erector being housed in the usual manner in the interior of a casing 2 which is movable around the transverse axis YY'. A counter-weight P, which is variable in its position on the axis ZZ', enables the swing of the suspended system to be regulated.

In order to simplify the drawings, neither the reference point indicators nor the reference selector members which follow the oscillations of the equipment, have been shown.

The compensating device, properly so-called, is essentially composed of a ball 3, guided and held by a cage 4. To this end, the ball 3 which constitutes the compensating out-of-balance weight, is caused to roll along two rails 5 and 6 formed by stamping out two shaped holes or cutouts in the side members of the cage 4. In addition, these holes limit the free movement of the ball 3 by their contour external to the guiding rail.

The diameter of the weight is greater than the spacing between the side members whereby the weight may readily be mounted on the track, which latter comprises a pair of arcuate, non-circular, intersecting segments symmetrically disposed about a vertical plane passing through said gyro-horizon.

The profile of this roller track is designed in such a manner that for each given angle of tilt, the moment of the ball with respect to the pivotal axis XX', shall be equal to the moment of the couple which must be subtracted from the swinging couple in order to cancel out the transverse component of the precession and thereby to ensure that a meridian precession is obtained which corresponds exactly to the given angle of tilt.

It will be self-evident that the invention has only been described and shown by way of example and not in any sense by way of limitation, and that modifications of detail may be made without thereby departing from the spirit or the scope of the invention.

Having thus described the invention, what is claimed as new and desired to be secured by Letters Patent, is:

1. In a gyro-horizon, a compensating device for ensuring the meridian direction of the precession for all values of the tilt angle of said gyro-horizon, comprising a counter-balance weight for opposing the swinging couple of said gyro-horizon, and a roller track for said weight, said weight being mounted for free movement along said track, said track being carried by said gyro-horizon and being profiled so that for each angle of tilt said weight assumes that position along said track wherein the counter-couple due to said weight acts in opposition to the swinging couple of said gyro-horizon to reduce the latter couple to the effective value corresponding to the respective angle of tilt for ensuring the meridian precession of said gyro-horizon.

2. In a gyro-horizon according to claim 1, said counter-balance weight comprising a spherical ball.

3. In a gyro-horizon having a suspension, a compensating device for ensuring the meridian direction of the precession for all values of the tilt angle of said gyro-horizon, comprising a spherical weight for opposing the swinging couple of said gyro-horizon, and a cage carried by said suspension and including a pair of spaced side members, said side members being provided with respective cut-out portions defining an arcuate track, said weight having a diameter greater than the spacing between said side members and being mounted between the latter for free movement along said track, the shape of said track being such that for each angle of tilt said weight assumes that position along said track wherein the counter-couple due to said weights acts in opposition to the swinging couple of said gyro-horizon to reduce the latter couple to the effective value corresponding to the respective angle of tilt for ensuring the meridian precession of said gyro-horizon.

4. In a gyro-horizon according to claim 3, said track comprising a pair of arcuate, non-circular, intersecting segments symmetrically disposed about a vertical plane passing through said gyro-horizon.

References Cited in the file of this patent

UNITED STATES PATENTS

| | | |
|---|---|---|
| 2,133,489 | Smith | Oct. 18, 1938 |
| 2,380,538 | Meredith | July 31, 1945 |
| 2,555,981 | Lynch et al. | June 5, 1951 |
| 2,603,095 | Barkalow | July 15, 1952 |